H. A. ANDRESEN.
TIRE FILLER.
APPLICATION FILED FEB. 16, 1920.

1,372,587.

Patented Mar. 22, 1921.

Holger A. Andresen, INVENTOR.

BY

ATTORNEYS.

UNITED STATES PATENT OFFICE.

HOLGER A. ANDRESEN, OF CHICAGO, ILLINOIS.

TIRE-FILLER.

1,372,587.  Specification of Letters Patent.  Patented Mar. 22, 1921.

Application filed February 16, 1920. Serial No. 359,068.

*To all whom it may concern:*

Be it known that I, HOLGER A. ANDRESEN, a subject of the King of Denmark, residing at Chicago, in the county of Cook and State of Illinois, have invented new and useful Improvements in Tire-Fillers, of which the following is a specification.

This invention relates to cushion tires for vehicles, and more particularly a tire in which resiliency is obtained by means of a core or filler of elastic material, the object of the invention being to provide a core or filler of novel and improved construction by which a maximum resiliency is obtained, so that the tire may be used in place of an ordinary pneumatic tire.

Figure 1:
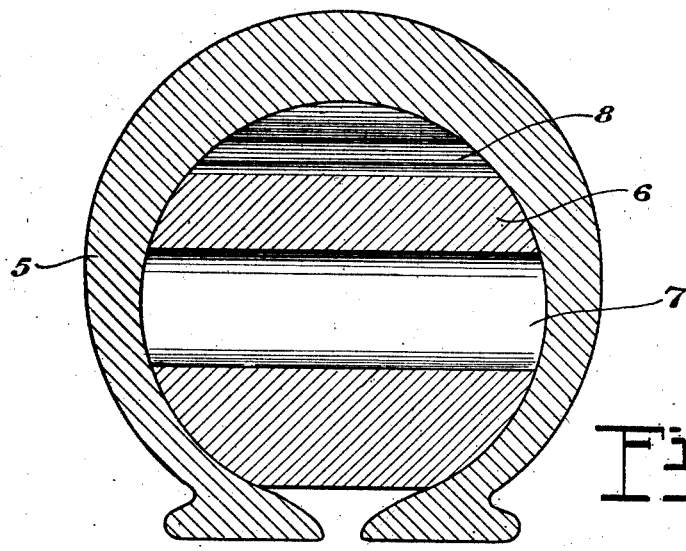
Figure 2:
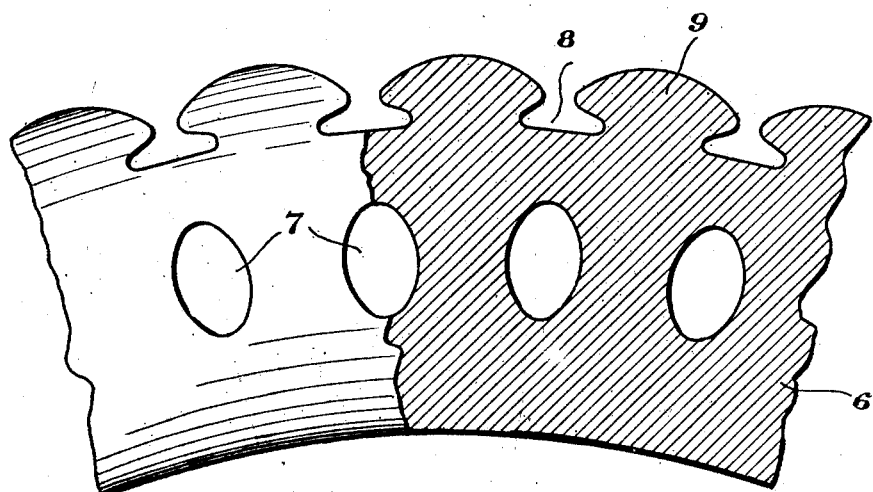

In order that the invention may be better understood, reference is had to the accompanying drawing forming a part of this specification, and in said drawing, Figure 1 is a cross section of the tire, and Fig. 2 is an elevation of a fragment of the core partly in section.

Referring specifically to the drawing, the tire is composed of an outer casing 5 similar to that of an ordinary pneumatic tire. However, the usual inflatable inner tube is not employed, and in its place a resilient core or filler 6 is used. This core is in the form of a continuous ring of such diameter as to completely fill the casing circumferentially, and of such cross-sectional contour and area as to fill the casing transversely down to within a short distance of its base as shown in Fig. 1, and to hold the same properly distended. The necessary resiliency is obtained by making the core of rubber or other suitable elastic material. Additional resiliency is obtained by forming the core, at regular intervals, with transverse openings 7 extending from one side to the other and opening therethrough. These openings are located between the outer surface and the base of the core, and they are oval in cross section as shown in Fig. 2. The openings are suitably spaced apart by the solid portions of the core. On the outer circumference of the core are uniformly spaced transverse recesses 8 which are in alinement, radially, with the openings 7. The recesses 8 are undercut or wider at their inner than at their outer ends, and they define a series of uniformly spaced protuberances 9 on the outer circumference of the core. These protuberances, by reason of the shape of the recesses, are reduced in width at the base where they join the main body of the core, as clearly shown in Fig. 2, and their outer surface is also curved in a convex manner in the direction of the length of the core, as well as transversely, the latter curvature being such as to conform to the transverse curvature of the tire casing 5 beneath the tread portion thereof.

The protuberances 9 coincide with the solid portions of the core 6 between the openings 7, and they form a series of cushions directly beneath the tread portion of the casing 5, which, together with the transverse openings 7, give the core sufficient resiliency to take the place of the ordinary inflatable inner tube. The openings 7 and the recesses 8 also result in a saving of material, and a reduction in the weight of the core. The core will be made in various sizes to fit different sized tire casings, and it may be used with any ordinary tire casing without any changes in the structure of the latter.

I claim:

1. A tire core comprising a body of elastic material shaped to fill an outer casing, said body having on its outer periphery a series of protuberances spaced longitudinally of the tire, the spaces between the protuberances being undercut and the protuberances being reduced in width at their bases.

2. A tire core comprising a body of elastic material shaped to fill an outer casing, said body having on its outer periphery a series of spaced protuberances extending transversely of the tire, the spaces between the protuberances opening through the outer periphery of the body, and being located beneath the tread surface of the tire, and said body also having a series of transverse openings which are in radial alinement with the spaces between the protuberances.

3. A tire core comprising a body of elastic material shaped to fill an outer casing, said body having on its outer periphery a series of spaced protuberances extending transversely of the tire, and said body also having a series of transverse openings which are in radial alinement with the spaces between the protuberances, said spaces being undercut and the protuberances being reduced in width at their bases.

In testimony whereof I affix my signature.

HOLGER A. ANDRESEN.